(12) United States Patent
Seki et al.

(10) Patent No.: US 12,389,082 B2
(45) Date of Patent: Aug. 12, 2025

(54) ELECTRONIC DEVICE, CONTROL METHOD OF ELECTRONIC DEVICE, AND NON-TRANSITORY COMPUTER READABLE STORAGE MEDIUM

(71) Applicant: CANON KABUSHIKI KAISHA, Tokyo (JP)

(72) Inventors: Takashi Seki, Kanagawa (JP); Akio Yoshikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 214 days.

(21) Appl. No.: 17/703,029

(22) Filed: Mar. 24, 2022

(65) Prior Publication Data

US 2022/0321827 A1 Oct. 6, 2022

(30) Foreign Application Priority Data

Mar. 31, 2021 (JP) .................................. 2021-060114

(51) Int. Cl.
*H04N 21/6587* (2011.01)
*G06T 7/73* (2017.01)
(Continued)

(52) U.S. Cl.
CPC ........... *H04N 21/6587* (2013.01); *G06T 7/73* (2017.01); *H04N 21/21805* (2013.01); *H04N 21/439* (2013.01)

(58) Field of Classification Search
CPC .. G06T 7/73; H04N 21/21805; H04N 21/439; H04N 21/6587
See application file for complete search history.

(56) References Cited

U.S. PATENT DOCUMENTS 9,369,635 B1 * 6/2016 Hilla ..................... H04N 23/632
9,866,964 B1 * 1/2018 Haskin ................... H04R 27/00
(Continued)

FOREIGN PATENT DOCUMENTS

CN 101506892 A 8/2009
CN 105122789 A 12/2015
(Continued)

OTHER PUBLICATIONS

The Jan. 7, 2025 Japanese Office Action, which is enclosed without an English Translation, that issued in Japanese Patent Application No. 2021-060114.

(Continued)

*Primary Examiner* — James R Sheleheda
(74) *Attorney, Agent, or Firm* — Cowan, Liebowitz & Latman, P.C.

(57) ABSTRACT

An electronic device according to the present invention includes at least one memory and at least one processor which function as: a selection unit configured to select a moving image or a sound included in at least any of a plurality of second contents respectively photographed by a plurality of second cameras different from a first camera; and an acquisition unit configured to in a case where a moving image included in at least any of the plurality of second contents is selected, acquire a third content including the selected moving image and a sound included in a first content photographed by the first camera, and in a case where a sound included in at least any of the plurality of second contents is selected, acquire a fourth content including the selected sound and a moving image included in the first content.

16 Claims, 12 Drawing Sheets

(51) Int. Cl.
*H04N 21/218* (2011.01)
*H04N 21/439* (2011.01)

(56) References Cited

U.S. PATENT DOCUMENTS

| | | | | |
|---|---|---|---|---|
| 2005/0193421 | A1* | 9/2005 | Cragun | H04N 21/2743 386/234 |
| 2007/0074115 | A1* | 3/2007 | Patten | G11B 27/032 |
| 2007/0107029 | A1* | 5/2007 | Monroe | H04N 19/179 348/E7.086 |
| 2008/0287059 | A1* | 11/2008 | Anderson, Jr. | H04S 1/002 455/3.06 |
| 2009/0284601 | A1* | 11/2009 | Eledath | G06T 7/215 375/E7.076 |
| 2010/0017716 | A1* | 1/2010 | Weda | G11B 27/034 715/719 |
| 2012/0014673 | A1* | 1/2012 | O'Dwyer | G10H 1/0025 386/E5.028 |
| 2012/0251081 | A1 | 10/2012 | Kawaguchi | |
| 2013/0093899 | A1* | 4/2013 | Curcio | G06F 16/487 707/E17.089 |
| 2013/0125000 | A1* | 5/2013 | Fleischhauer | H04N 21/2743 715/723 |
| 2013/0177293 | A1* | 7/2013 | Mate | H04N 9/8205 386/239 |
| 2013/0188932 | A1* | 7/2013 | Hartley | H04N 9/87 386/282 |
| 2013/0294749 | A1* | 11/2013 | Burns | H04N 21/6543 386/278 |
| 2013/0315404 | A1* | 11/2013 | Goldfeder | H04R 3/005 381/92 |
| 2014/0161354 | A1* | 6/2014 | Curcio | G06V 20/41 382/190 |
| 2014/0186004 | A1* | 7/2014 | Hamer | G11B 27/32 386/223 |
| 2016/0155475 | A1* | 6/2016 | Hamer | H04N 21/8456 386/224 |
| 2017/0111674 | A1* | 4/2017 | Meredith | H04N 21/47202 |
| 2019/0141388 | A1* | 5/2019 | Wang | G06F 16/41 |
| 2020/0314468 | A1* | 10/2020 | Kahler | G11B 27/10 |
| 2021/0321163 | A1* | 10/2021 | Ramos | G06N 20/00 |
| 2022/0101630 | A1* | 3/2022 | Arrison | G06F 16/743 |
| 2022/0256231 | A1* | 8/2022 | Eniwumide | H04N 21/816 |
| 2022/0321827 | A1* | 10/2022 | Seki | H04N 5/77 |

FOREIGN PATENT DOCUMENTS

| | | |
|---|---|---|
| CN | 110650294 A | 1/2020 |
| JP | 2007300220 A | 11/2007 |
| JP | 2016508309 A | 3/2016 |
| JP | 2019-220848 A | 12/2019 |

OTHER PUBLICATIONS

The Mar. 3, 2025 Chinese Office Action, which is enclosed with an English Translation, that issued in Chinese Patent Application No. 202210337259.X.

The Sep. 30, 2024 Chinese Office Action, which is enclosed without an English Translation, that issued in Chinese Patent Application No. 202210337259.X.

* cited by examiner

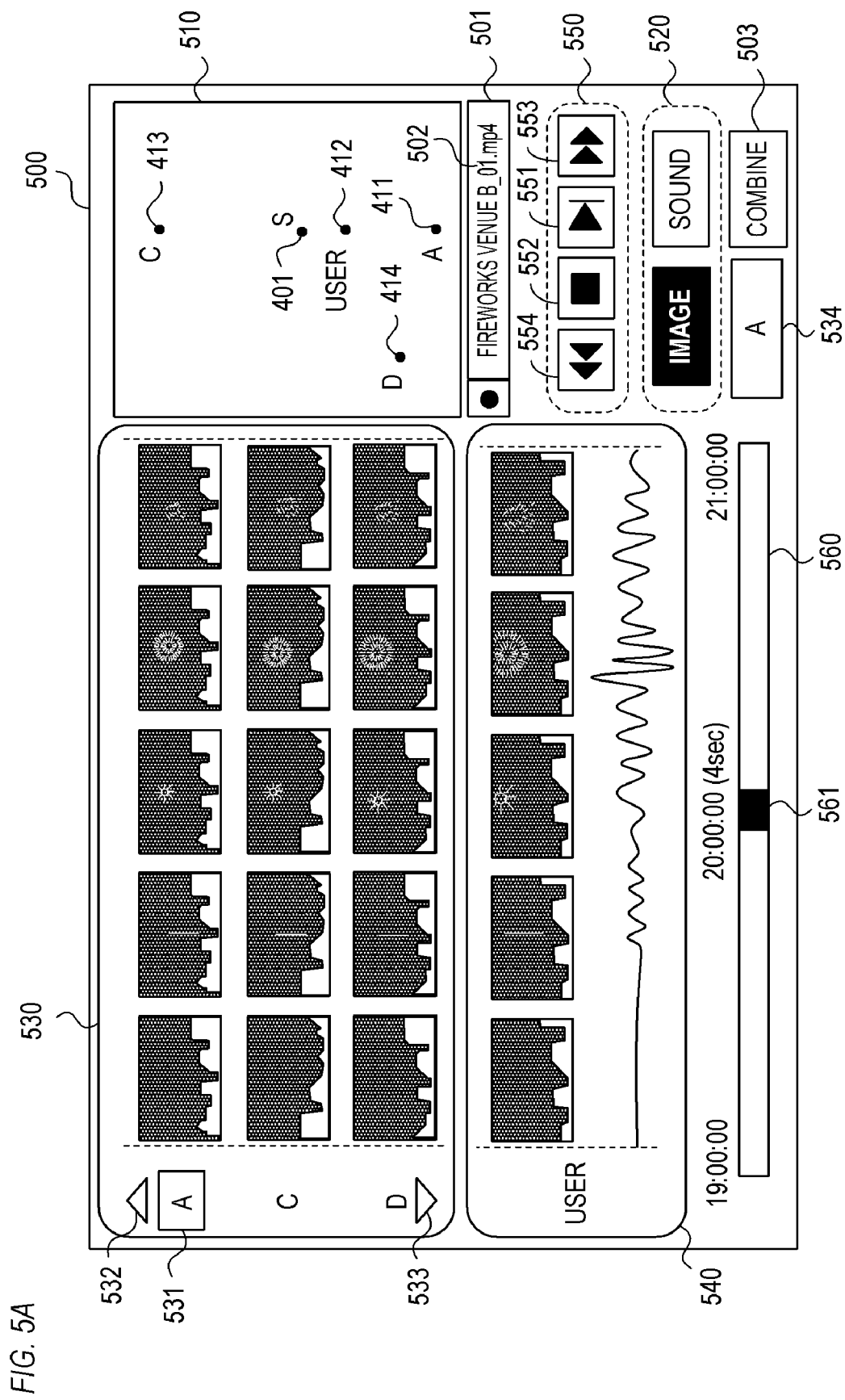

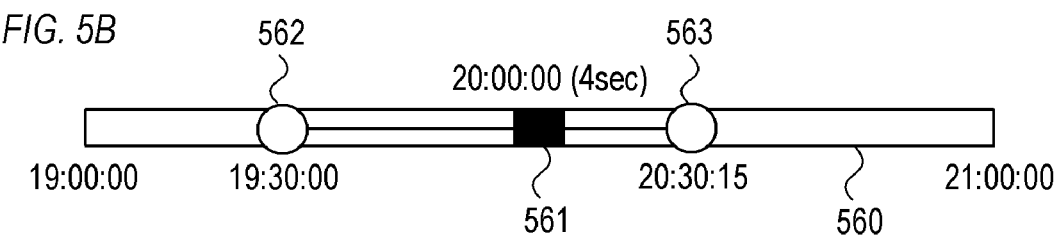

ELECTRONIC DEVICE, CONTROL METHOD OF ELECTRONIC DEVICE, AND NON-TRANSITORY COMPUTER READABLE STORAGE MEDIUM

BACKGROUND OF THE INVENTION

Field of the Invention

The present invention relates to a method for combining a moving image and a sound.

Description of the Related Art

Conventionally, the sharing of media contents through SNS (Social Network Site), clouds, or the like has been brisk. Further, the generation of contents through the combination of a plurality of elements has been performed. For example, Japanese Patent Application Laid-open No. 2019-220848 discloses a technology to combine a sound acquired from a microphone and an image acquired from a camera together.

However, in the method disclosed in Japanese Patent Application Laid-open No. 2019-220848, a sound acquired from a prescribed microphone and an image acquired from a prescribed camera are combined. Therefore, a user has to perform photographing again when becoming aware of the low quality of an image after the photographing. Similarly, the user has to perform recording again when becoming aware of the low quality of a sound after the recording. That is, it is not possible to easily generate a high-quality content according to the method disclosed in Japanese Patent Application Laid-open No. 2019-220848.

SUMMARY OF THE INVENTION

The present invention is provides a technology with which it is possible to easily generate a high-quality content.

An electronic device according to the present invention includes at least one memory and at least one processor which function as: a selection unit configured to select a moving image or a sound included in at least any of a plurality of second contents respectively photographed by a plurality of second cameras different from a first camera; and an acquisition unit configured to in a case where a moving image included in at least any of the plurality of second contents is selected, acquire a third content including the selected moving image and a sound included in a first content photographed by the first camera, and in a case where a sound included in at least any of the plurality of second contents is selected, acquire a fourth content including the selected sound and a moving image included in the first content.

Further features of the present invention will become apparent from the following description of exemplary embodiments with reference to the attached drawings.

BRIEF DESCRIPTION OF THE DRAWINGS

FIG. 5A and FIGS. 5C to 5E are diagrams showing an application screen;
FIG. 5B is a diagram showing a seek bar.

DESCRIPTION OF THE EMBODIMENTS

Figure 1:
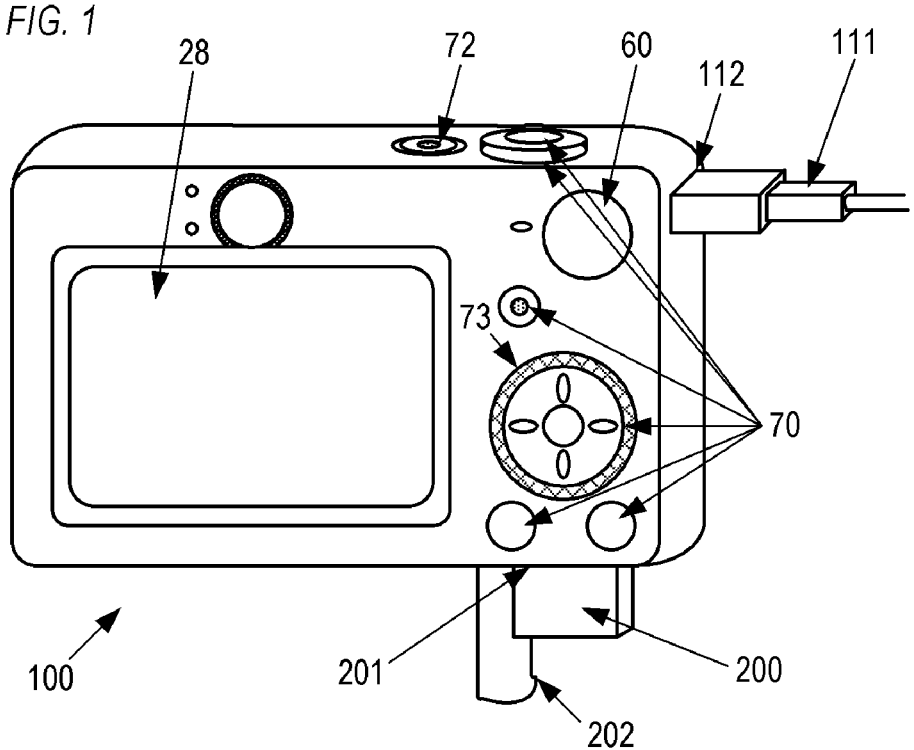
FIG. 1 is an external appearance view of a digital camera.

Hereinafter, preferred embodiments of the present invention will be described with reference to the drawings. FIG. 1 is an external appearance view of a digital camera 100 (imaging apparatus) according to the present embodiment. A display unit 28 is a display unit that displays images or various information. A mode selection switch 60 is an operation unit used to select various modes. A connector 112 is a connector between a connection cable 111 for connection with an external device such as a personal computer and a printer and the digital camera 100. An operation unit 70 is an operation unit including operation members such as various switches, buttons, and a touch panel that receive various operations from a user. A controller wheel 73 is a rotationally-operable operation member included in the operation unit 70. A power switch 72 is a press button used to select between a power-on state and a power-off state. A recording medium 200 is a recording medium such as a memory card. A recording medium slot 201 is a slot used to store the recording medium 200. The recording medium 200 stored in the recording medium slot 201 is enabled to perform communication with the digital camera 100. When the recording medium 200 is stored in the recording medium slot 201, the recording of an image on the recording medium 200, the reproduction of an image recorded on the recording medium 200, or the like is enabled. A lid 202 is the lid of the recording medium slot 201. FIG. 1 shows a state in which a part of the recording medium 200 is taken out from the slot 201 and exposed with the lid 202 opened.

Figure 2:
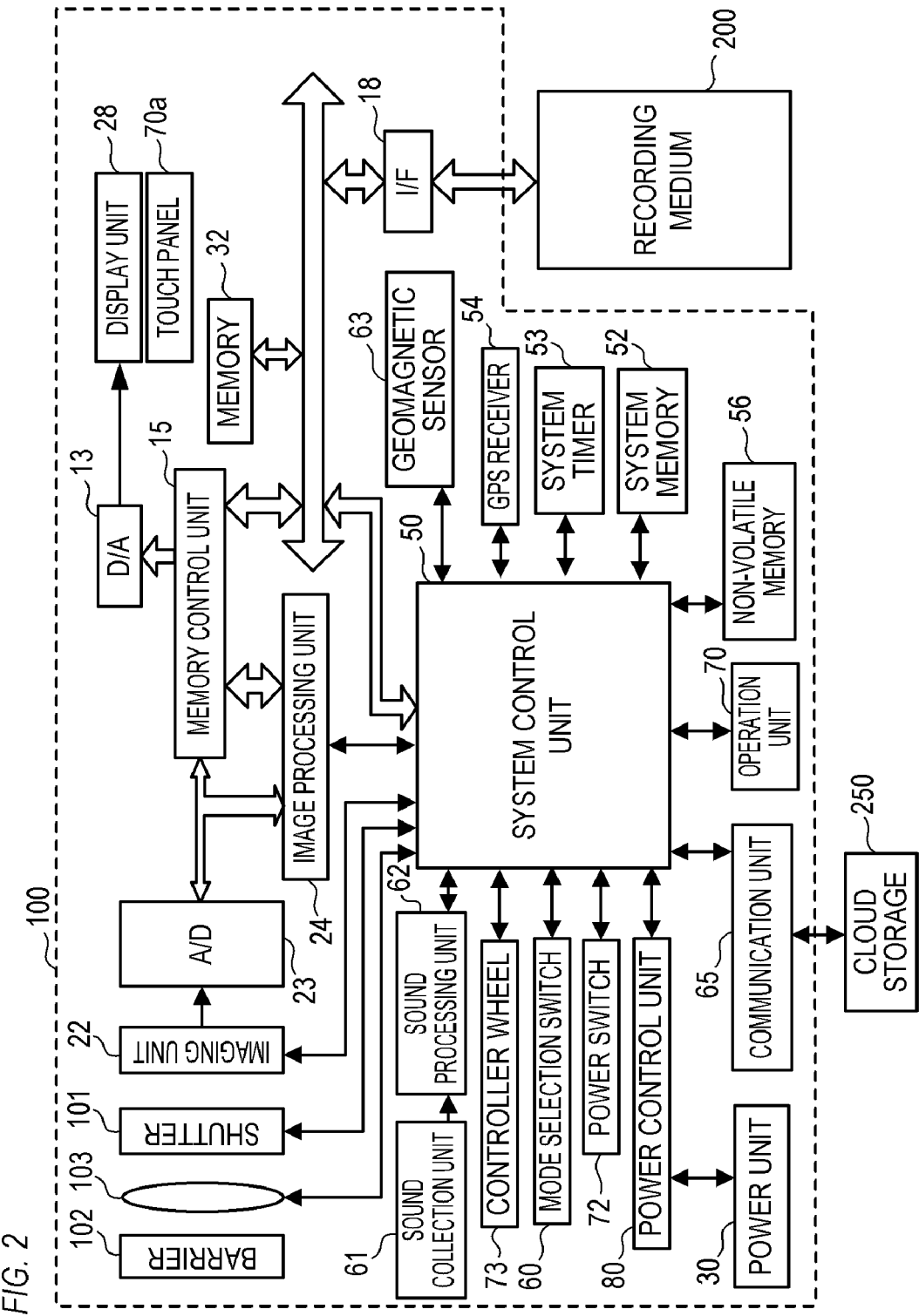
FIG. 2 is a block diagram of the digital camera.

FIG. 2 is a block diagram showing a configuration example of the digital camera 100. In FIG. 2, a photographing lens 103 is a lens group including a zoom lens and a focus lens. A shutter 101 is a shutter having an aperture function. An imaging unit 22 is an imaging element (image sensor) constituted by a CCD element, a CMOS element, or the like that converts an optical image into an electric signal. An A/D converter 23 converts an analog signal into a digital signal. The A/D converter 23 is used to convert an analog signal output from the imaging unit 22 into a digital signal. A barrier 102 covers an imaging system including the photographing lens 103 of the digital camera 100 to prevent the stain or damage of the imaging system including the photographing lens 103, the shutter 101, and the imaging unit 22.

An image processing unit 24 performs resize processing such as prescribed pixel interpolation and reduction or color conversion processing on data from the A/D converter 23 or data from a memory control unit 15. Further, the image processing unit 24 performs prescribed computation processing using captured image data. A system control unit 50 performs exposure control and ranging control on the basis of a computation result obtained by the image processing unit 24. Thus, AF (Automatic Focus) processing, AE (Automatic Exposure) processing, EF (Electronic Flash Pre-Emission) processing of a TTL (Through The Lens) system are performed. In addition, the image processing unit 24 performs prescribed computation processing using captured image data and performs AWB (Automatic White Balance) processing of the TTL system on the basis of an obtained computation result.

Output data from the A/D converter 23 is directly written in a memory 32 via the image processing unit 24 and the memory control unit 15 or via the memory control unit 15. The memory 32 stores image data that is obtained by the imaging unit 22 and converted into digital data by the A/D converter 23 or image data that is to be displayed on a display unit 28. The memory 32 includes sufficient storage capacity to store a prescribed number of static images or moving images and sounds for a prescribed time.

Further, the memory 32 serves also as a memory (video memory) for an image display. A D/A converter 13 converts data for an image display that is stored in the memory 32 into an analog signal and supplies the converted signal to the display unit 28. Thus, image data for a display written in the memory 32 is displayed on the display unit 28 via the D/A converter 13. The display unit 28 performs a display corresponding to an analog signal from the D/A converter 13 on a display device such as an LCD. A digital signal that is A/D-converted by the A/D converter 23 and stored in the memory 32 is D/A-converted into an analog signal by the D/A converter 13, and the converted signal is transferred to the display unit 28 to be displayed. By sequentially performing the above processing, the function of an electron viewfinder is realized to enable a through image display (live-view display (LV display)). Hereinafter, an image that is displayed in a live-view display mode will be called a live-view image (LV image).

A non-volatile memory 56 is a memory that serves as an electrically erasable and recordable recording medium, and an EEPROM or the like is, for example, used as such. The non-volatile memory 56 stores a constant, a program, or the like used to operate the system control unit 50. Here, the program represents a computer program used to perform various flowcharts that will be described later in the present embodiment.

The system control unit 50 is a control unit including at least one processor and/or at least one circuit and controls the entire digital camera 100. The system control unit 50 performs a program recorded on the non-volatile memory 56 described above to realize the various processing of the present embodiment that will be described later. A RAM is, for example, used as a system memory 52. In the system memory 52, a constant and a variable used to operate the system control unit 50, a program read from the non-volatile memory 56, or the like is developed. Further, the system control unit 50 also controls the memory 32, the D/A converter 13, the display unit 28, or the like to perform display control.

A system timer 53 is a timing unit that measures a time used for various control or a time on an embedded clock.

A sound collection unit 61 collects a sound and inputs obtained sound data to a sound processing unit 62. The sound collection unit 61 has a microphone, a conversion unit that converts a sound received by the microphone into sound data, or the like. The sound processing unit 62 performs noise reduction processing, amplification processing, or the like on sound data input from the sound collection unit 61.

A geomagnetic sensor 63 detects the components of terrestrial magnetism in vertical and horizontal directions and detects the angle between a reference direction based on a north direction and the light axis of the imaging unit 22 as a directional angle to detect the imaging direction (photographing direction) of the digital camera 100. The geomagnetic sensor 63 is constituted by, for example, an acceleration sensor, a gyro sensor, or the like.

A GPS receiver 64 measures geographic information using an artificial satellite. For example, the GPS receiver 64 emits a signal to an artificial satellite and receives a response. Then, the GPS receiver 64 specifies the geographic position (for example, the latitude or longitude) of the digital camera 100 on the basis of a time difference from the emission of the signal to the reception of the response. The specification of a photographing position or the like is enabled by the GPS receiver 64.

A communication unit 65 performs the transmission and reception of a video signal or a sound signal with an external device connected by a wireless or wired cable. The communication unit 65 is connectable to a wireless LAN (Local Area Network) or the Internet. Further, the communication unit 65 is enabled to perform communication with an external device through Bluetooth™ or Bluetooth Low Energy. The communication unit 65 is enabled to transmit an image (including a live image) captured by the imaging unit 22 or an image recorded on the recording medium 200 to an external device such as a cloud data storage 250 and also enabled to receive image data or various other information from the external device.

The mode selection switch 60 and the operation unit 70 are operation means for inputting various operation instructions to the system control unit 50. The mode selection switch 60 switches the operation mode of the system control unit 50 to any of a static-image recording mode, a moving-image photographing mode, a reproduction mode, or the like. The static-image recording mode includes an automatic photographing mode, an automatic scene determination mode, a manual mode, an aperture priority mode (Av mode), a shutter-speed priority mode (Tv mode), and a program AE mode. Further, the static-image recording mode includes a various-scene mode, a custom mode, or the like that represents photographing settings for each photographing scene. The user is enabled to directly switch to any of the modes by the mode selection switch 60. Alternatively, the user may select any of a plurality of displayed modes after once switching to the screen of a list of the photographing modes by the mode selection switch 60 and switch to the selected mode using another operation member. Similarly, the moving-image photographing mode may include a plurality of modes.

The respective operation members of the operation unit 70 are appropriately assigned functions for each scene when various function icons displayed on the display unit 28 are selected and operated, and serve as various function buttons. The function buttons include, for example, an end button, a back button, an image-feed button, a jump button, a narrow-down button, an attribute change button, or the like. For example, a menu screen enabling various settings is displayed on the display unit 28 when a menu button is pressed. The user is enabled to intuitively perform various settings using the menu screen displayed on the display unit 28, four-direction buttons for upper, lower, right, and left directions, and a SET button.

The controller wheel 73 is a rotationally-operable operation member included in the operation unit 70 and used to perform the specification of a selected item or the like together with the direction buttons. An electric pulse signal is generated according to an operation amount when the controller wheel 73 is rotationally operated, and the system control unit 50 controls the respective units of the digital camera 100 on the basis of the pulse signal. The determination of an angle at which the controller wheel 73 is rotationally operated, the number of rotations of the controller wheel 73, or the like is enabled by the pulse signal. Note that any operation member may be used as the controller wheel 73 so long as the detection of the rotational operation of the controller wheel 73 is made possible. For example, the controller wheel 73 may be a dial operation member. In this case, the controller wheel 73 itself rotates according to a user's rotational operation and generates a pulse signal. Further, the controller wheel 73 may be an operation member that is composed of a touch sensor (so-called a touch wheel). In this case, the controller wheel 73 itself does not rotate and detects a rotational operation or the like by a user's finger on the controller wheel 73.

A power control unit 80 is constituted by a battery detection circuit, a DC-DC converter, a switch circuit that switches a block to be energized, or the like, and detects the presence or absence of the installation of a battery, a battery type, and a remaining battery amount. Further, the power control unit 80 controls the DC-DC converter on the basis of the detection results and instructions from the system control unit 50 and supplies a necessary voltage to respective units including the recording medium 200 for a necessary period. A power unit 30 includes a primary battery such as an alkali battery and a lithium battery, a secondary battery such as a NiCd battery, a NiMH battery, and a Li battery, an AC adapter, or the like.

A recording medium I/F 18 is an interface with the recording medium 200 such as a memory card. The recording medium 200 is a recording medium such as a memory card used to record photographed images and is constituted by a semiconductor memory, an optical disk, a magnetic disk, or the like.

The digital camera 100 has a touch panel 70a with which a touch operation on the display unit 28 is detectable as one of the operation members included in the operation unit 70. The touch panel 70a may be integrated with the display unit 28. For example, the touch panel 70a is configured so that its light transmittance does not hinder the display of the display unit 28 and is attached to the upper layer of the display surface of the display unit 28. Further, input coordinates in the touch panel 70a are associated with display coordinates on the display surface of the display unit 28. Thus, it is possible to provide a GUI (Graphical User Interface) with which the user is capable of intuitively operating a screen displayed on the display unit 28. The system control unit 50 is enabled to detect the following operations or states on the touch panel 70a.

A state in which a finger or a pen that has not touched the touch panel 70a newly touches the touch panel 70a, i.e., the start of a touch (hereinafter called touch-down).

A state in which the touch panel 70a is touched by a finger or a pen (hereinafter called touch-on).

A state in which a finger or a pen moves while touching the touch panel 70a (hereinafter called touch-move).

A state in which a finger or a pen that has touched the touch panel 70a is released from the touch panel 70a, i.e., the end of a touch (hereinafter called touch-up).

A state in which nothing has touched the touch panel 70a (hereinafter called touch-off).

The touch-on is detected simultaneously when the touch-down is detected. Generally, the touch-on is continuously detected unless the touch-up is detected after the touch-down. The touch-on is detected simultaneously when the touch-move is detected. However, even if the touch-on has been detected, the touch-move is not detected unless a touch position has been moved. After the touch-up of all touched fingers or a pen is detected, the touch-off is detected.

The system control unit 50 is notified of these operations and states or position coordinates at which a finger or a pen has touched the touch panel 70a via an internal bus. On the basis of notified information, the system control unit 50 determines what operation (touch operation) has been performed on the touch panel 70a. For the touch-move, the system control unit 50 is also enabled to determine the movement direction of a finger or a pen that moves on the touch panel 70a for each of a vertical component and a horizontal component on the touch panel 70a on the basis of the changes of position coordinates. The system control unit 50 determines that a slide operation has been performed when detecting the touch-move for at least a prescribe distance. The operation of quickly moving a finger for a certain distance while touching the touch panel 70a and then releasing the same will be called a flick. In other words, the flick is an operation to quickly trace the touch panel 70a so as to be flipped with a finger. The system control unit 50 is enabled to determine that the flick has been performed when detecting that the touch-move has been performed for at least a prescribed distance and at at least a prescribed speed and then the touch-up has been performed in succession to the touch-move (the flick has been performed in succession to the slide operation). In addition, the touch operation of simultaneously touching a plurality of places (for example, two points) and making the touched positions get close to each other will be called pinch-in, and the touch operation of making the touched positions get away from each other will be called pinch-out. The pinch-out and the pinch-in will be generically called a pinch operation (or simply a pinch). The touch panel 70a may be of any type among touch panels such as a resistance film type, a capacitance type, a surface acoustic-wave type, an infrared type, an electromagnetic induction type, an image recognition type, and an optical sensor type. As touch panels, there are a type that detects a touch when a touch panel is touched and a type that detects a touch when a finger or a pen approaches a touch panel. However, any of the touch panels may be used.

The cloud data storage 250 is enabled to store information such as image data and transmit/receive information to/from the communication unit 65 of the digital camera 100.

Figure 3:
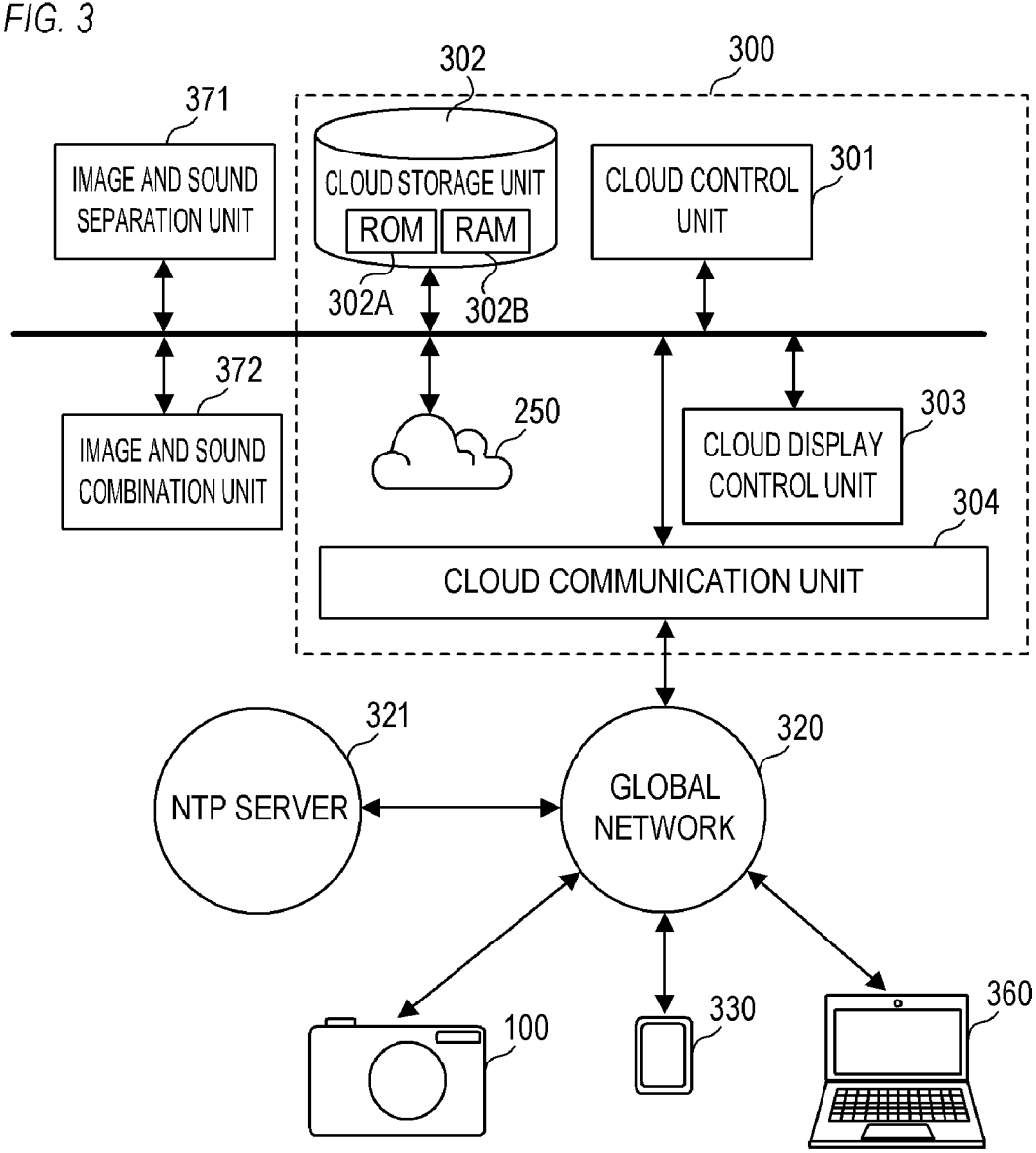
FIG. 3 is a diagram showing the configuration of a cloud system.

FIG. 3 is a diagram showing a configuration example of a cloud system according to the present embodiment. In the cloud system of FIG. 3, a cloud server 300 has a cloud control unit 301, a cloud storage unit 302, a cloud display control unit 303, a cloud communication unit 304, or the like. The cloud server 300 is connected to a global network 320. In FIG. 3, the global network 320 is also connected to a camera (digital camera) 100, a smart phone 330, and a PC (Personal Computer) 360. The global network 320 is connected to a NTP (Network Time Protocol) server 321, and a device connected to the global network 320 is enabled to perform time synchronization with the NTP server 321.

Note that the present invention is applicable to the camera 100, the cloud server 300, the smart phone 330, the PC 360, or the like. The present invention may be grasped as a cloud system including the cloud server 300 and an electronic device (terminal) connected to the cloud server 300.

The cloud communication unit 304 receives signals from respective terminals such as the camera 100, the smart phone 330, and the PC 360 connected to the cloud server 300 via the global network 320 and converts the received signals into the control signals of the cloud server 300. Further, the cloud communication unit 304 transmits the information of the cloud server 300 to the respective terminals. The cloud storage unit 302 is constituted by a ROM 302A or a RAM 302B and constituted by a program for operating the cloud server 300, a work memory for storing or processing sound data or image data, or the like. The cloud display control unit 303 controls the video output device (not shown) of the cloud server 300 or information to be displayed on the respective terminals connected to the cloud server 300. As an example of a method for displaying the information on the respective terminals, a method using a web browser or the like is available. The cloud control unit 301 controls the entire cloud server 300 on the basis of signals transmitted to and received from the input device (not shown), the cloud storage unit 302, the cloud display control unit 303, and the cloud communication unit 304 of the cloud server 300.

The cloud server 300 is connected to the cloud data storage 250. The cloud server 300 is enabled to store data from respective terminals connected to the cloud server 300 in the cloud data storage 250 or transmit data stored in the cloud data storage 250 to the respective terminals.

The cloud server 300 is connected to an image and sound separation unit 371 and an image and sound combination unit 372. The image and sound separation unit 371 separates data stored in the cloud data storage 250 or the cloud storage unit 302 into image data and sound data. The separated respective data is stored in the cloud data storage 250 or the cloud storage unit 302. The image and sound combination unit 372 combines image data and sound data stored in the cloud data storage 250 or the cloud storage unit 302 together as combination data composed of a sound and an image. The combination data is stored in the cloud data storage 250 or the cloud storage unit 302. Note that each of the image and sound separation unit 371 and the image and sound combination unit 372 may be a part of the cloud server 300.

Figure 4A:
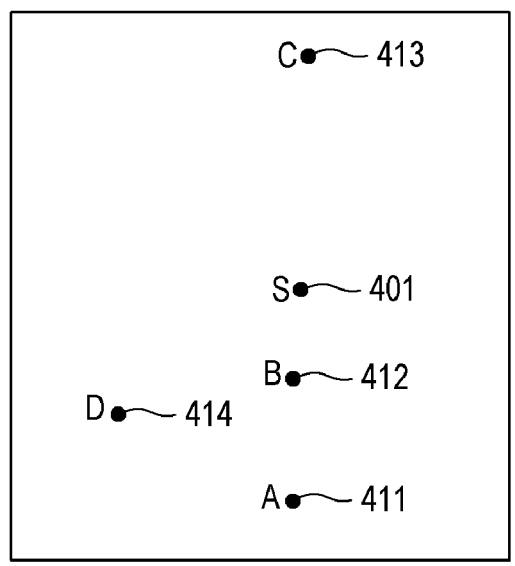
FIG. 4A is a diagram showing photographing scenes.

FIG. 4A shows a fireworks venue that is an example of a photographing place according to the present embodiment. An object 401 (fireworks) is photographed as a moving-image content by a photographer 411 at a spot A, a photographer 412 at a spot B, a photographer 413 at a spot C, and a photographer 414 at a spot D. A moving-image content may include a moving image and a sound. In the present embodiment, the photographer 411 photographs the object 401 by the camera 100, and the photographer 412 photographs the object 401 by the smart phone 330. Each of the photographers accesses the cloud server 300 and stores a moving-image content in the cloud data storage 250. Further, a moving-image content photographed by each of the photographers includes the information of a photographing position or a photographing direction (posture) as meta information.

Figure 4B:
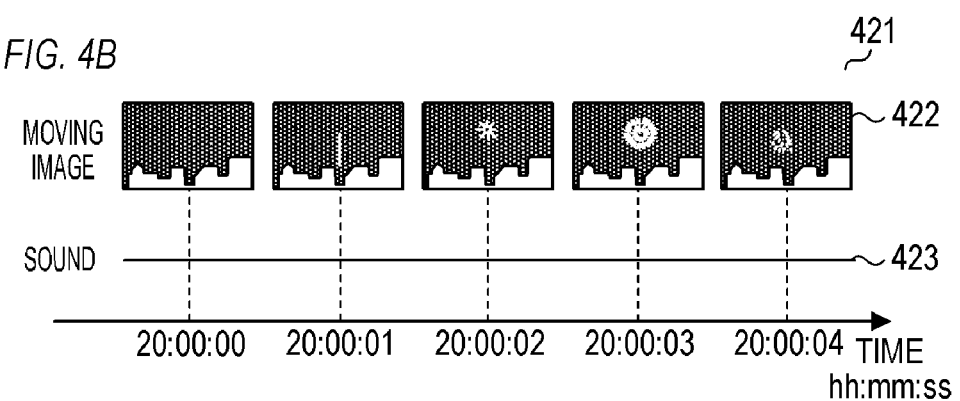
FIGS. 4B and 4C are diagrams each showing a moving-image content.
Figure 4C:
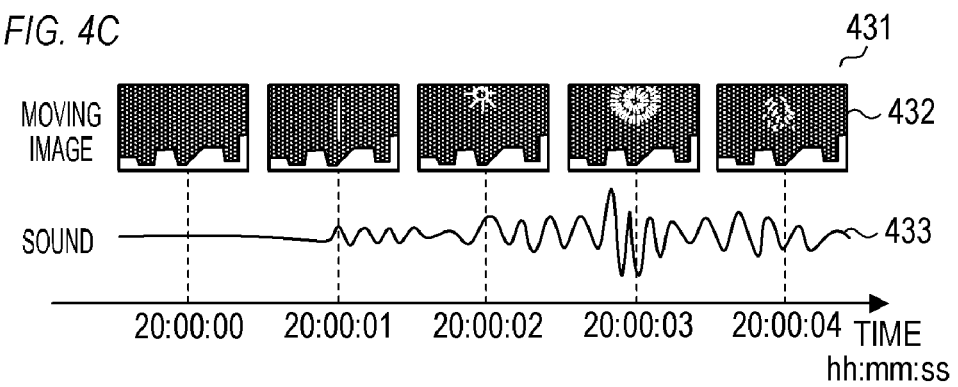

FIG. 4B shows a moving-image content 421 photographed by the photographer 411, and FIG. 4C shows a moving-image content 431 photographed by the photographer 412. The moving-image content 421 is constituted by a moving image 422 and a sound 423. The moving-image content 431 is constituted by a moving image 432 and a sound 433. In the moving image 432, the fireworks are protruded beyond a maximum field angle due to an error in the settings of the smart phone 330 or the like. Therefore, the video quality of the moving image 432 is low. In the moving image 422 photographed by the photographer 411, the fireworks are recorded so as to fall within the entire field angle. Therefore, the video quality of the moving image 422 is fine.

FIG. 5A shows an example of an application screen 500 of the smart phone 330. The application screen 500 is, for example, the screen of a web browser or the screen of a dedicated application. Here, the smart phone 330 corresponds to a first camera of the present invention, and another device (terminal) used for photographing corresponds to a second camera of the present invention. The application screen 500 is displayed on the basis of the control signal of the cloud display control unit 303. It is possible to perform an operation on the application screen 500 using an input device such as the touch panel (not shown) of the smart phone 330. Then, the smart phone 330 is enabled to transmit a control signal to the cloud control unit 301 according to the operation on the application screen 500.

The application screen 500 is constituted by a plurality of units. A file selection button 501 is a button used to select a moving-image content photographed by the smart phone 330. A position display window 510 is a window used to display the photographing positions of a plurality of moving-image contents stored in the cloud data storage 250. In the position display window 510, the position of the object 401 (sound source) is also displayed. Further, as the photographing positions of a moving-image content photographed by the smart phone 330, the photographing positions of the moving-image content 502 selected by the file selection button 501 are displayed so as to be discriminable. When a moving-image content is selected by the file selection button 501, the cloud control unit 301 acquires (the data) of the selected moving-image content from the cloud data storage 250. The acquired data (information) includes not only moving-image data and sound data but also the information of the photographing times and the photographing positions of the moving-image content 502. The acquired data (information) may also include the information of the photographing directions of the moving-image content 502. On the basis of the acquired data (the information of the photographing positions of the moving-image content 502), the cloud display control unit 303 displays the photographing positions of the moving-image content 502 in the position display window 510. Similarly, the data of another moving-image content is acquired, and the photographing positions of the moving-image content are displayed in the position display window 510. The position of the object 401 is set in advance.

The data of the moving-image content 502 is also displayed in a user content information window 540 by the control of the cloud display control unit 303. In the user content information window 540, the reduction images (thumbnails) of a moving image are displayed as items (image information) relating to the moving image of the moving-image content 502. Specifically, the thumbnails of a plurality of frames in a designated period 561 that is a period designated in a seek bar 560 are displayed. It is possible to change the designated period 561 through the touch operation of a user. Further, the waveform of a sound is also displayed as an item (sound information) relating to the sound of the moving-image content 502. The moving-image data and the sound data of the moving-image content 502 are acquired by the image and sound separation unit 371 and stored in the cloud storage unit 302.

A sound and image selection button 520 is a button used to select whether a sound is combined or a moving image is combined with the moving-image content 502. In the moving-image content 502, the fireworks are protruded beyond the maximum field angle. Therefore, the video quality of the moving-image content 502 is low. In such a case, the user selects an item "image (combining a moving image)" with the sound and image selection button 520. Here, a case in which a moving image is combined will be described. A case in which a sound is combined will be described later.

A selection content information window 530 is a window in which the data of moving-image contents other than the moving-image content 502 among moving-image contents displayed in the position display window 510 is displayed. Like the user content information window 540, the thumbnails of a plurality of frames in the designated period 561 are displayed. In the selection content information window 530, a combination selection cursor 531 and display switch buttons 532 and 533 are also displayed. The combination selection cursor 531 is a cursor used to select a moving-image content to be combined with the moving-image content 502. In a selection result window 534, a result (for example, the identifier of a selected moving-image content) selected by the combination selection cursor 531 is displayed. The display switch buttons 532 and 533 are buttons used when only a part of the moving-image contents is displayed in the selection content information window 530, and used to switch a moving-image content to be displayed in the selection content information window 530.

A content confirmation button group 550 includes a reproduction and pause button 551, a stop button 552, a fast-forwarding button 553, and a fast-reversing button 554. In the user content information window 540, the moving-image content 502 (the thumbnails and the waveform) are displayed so as to enable the reproduction of moving images. When the reproduction and pause button 551 is touched in a state in which the moving-image content 502 is not being reproduced, the reproduction of the moving-image content 502 is started. When the reproduction and pause button 551 is touched in a state in which the moving-image content 502 is being reproduced, the reproduction of the moving-image content 502 is paused. The fast forwarding of the moving-image content 502 is performed when the fast-forwarding button 553 is touched, and the fast reversing of the moving-image content 502 is performed when the fast-reversing button 554 is touched. Instead of the moving-image content 502, the reproduction of a moving-image content selected by the combination selection cursor 531 may be controlled. The reproduction of all the moving-image contents being displayed in the selection content information window 530 may be simultaneously controlled. For example, (a part or all of) a moving-image content being displayed in the selection content information window 530 may be reproduced together with the reproduction of the moving-image content 502. If the reproduction of a plurality of moving-image contents is simultaneously controlled, the user is enabled to simultaneously confirm the plurality of moving-image contents. The reproduction and display of moving-image contents is controlled by the cloud control unit 301 and the cloud display control unit 303.

A combination start button 503 is a button used to combine a moving image and a sound together to generate (acquire) a new moving-image content (combination content). When the combination start button 503 is touched, the smart phone 330 transmits a control signal for starting combination to the cloud server 300. The control signal is input to the cloud control unit 301 via the cloud communication unit 304. The cloud control unit 301 performs control to generate a combination content according to the reception of the control signal.

Here, combining a moving image with respect to the moving-image content 502 is selected by the sound and image selection button 520. Therefore, the cloud control unit 301 performs control to combine the sound (sound data) of the moving-image content 502 and the moving image (moving-image data) of a moving-image content displayed in the selection result window 534 together. Specifically, the cloud control unit 301 instructs the image and sound separation unit 371 to separate moving-image data from the data of the moving-image content displayed in the selection result window 534. The image and sound separation unit 371 stores the separated moving-image data in the cloud storage unit 302 and notifies the cloud control unit 301 of the completion of the separation. Upon receiving the notification of the completion of the separation, the cloud control unit 301 instructs the image and sound combination unit 372 to combine the sound data of the moving-image content 502 and the moving-image data of the moving-image content displayed in the selection result window 534 together. Both the sound data and the moving-image data are stored in the cloud storage unit 302. The image and sound combination unit 372 stores a moving-image content (combination content) obtained by the combination in the cloud data storage 250, the cloud storage unit 302, or the smart phone 330 (user terminal). The user is enabled to confirm the combination content using the smart phone 330.

During the combination, a progressive bar (not shown) may be displayed to notify the user (photographer 412) of the progress of the combination. The file name of the combination content may or may not be, for example, a file name obtained by adding a prefix or a postfix to the file name of the moving-image content 502. With the arrangement of a file-name input box (not shown) to which the user inputs a file name in the application screen 500, an arbitrary file name input to the file-name input box may be set as the file name of the combination content.

FIG. 5B shows a modified example of the seek bar 560. In FIG. 5B, a combination start pointer 562 used to designate a combination start time and a combination end pointer 563 used to designate a combination end time are superimposed on the seek bar 560. It is possible to change the positions of the combination start pointer 562 and the combination end pointer 563 through a drag operation or a touch operation. In this case, the image and sound combination unit 372 replaces, from among the moving image content 502, a moving image or a sound in a period from the combination start time to the combination end time with that of another moving-image content to generate a combination content. Such a mode is suitable for a case in which another moving-image content is required to be combined only in a period in which the quality of the moving-image content 502 is poor.

Figure 5C:
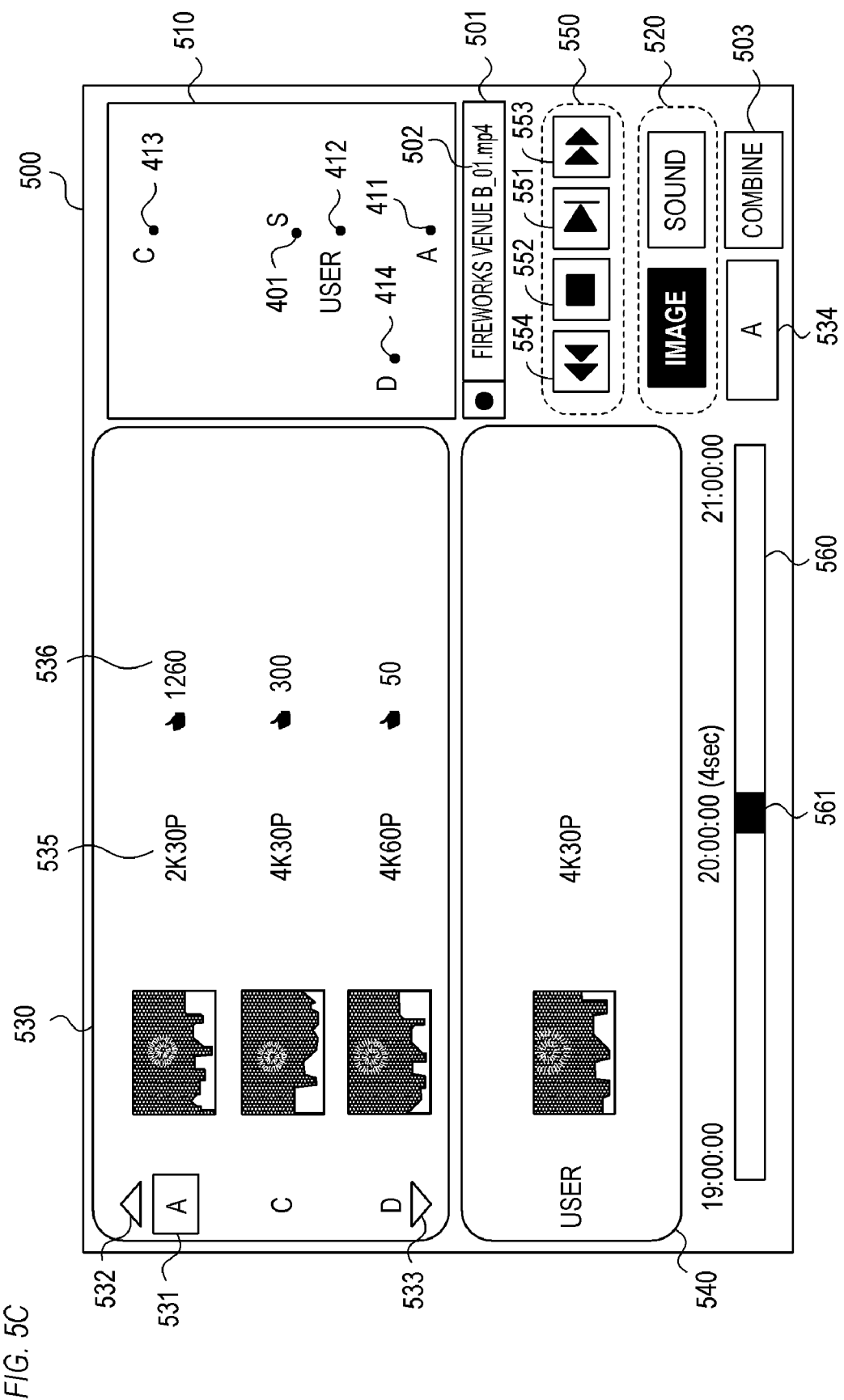

FIG. 5C shows a modified example of the application screen 500. In the selection content information window 530 of FIG. 5C, the image-quality information (specifically, resolution 535) of moving images is displayed as image information. It is possible to select a high-quality moving image with the display of the image-quality information. Further, evaluation values 536 by users (user evaluation values) are also displayed as image information. The user evaluation values include, for example, the number of "likes" managed by SNS (Social Network Site) or the like. Through the display of the user evaluation values 536, the user (photographer 412) is enabled to select a moving image on the basis of evaluation by other users. As a result, it is possible to generate a combination content easily evaluated by third persons.

The image information is not limited to the above but may include, for example, the information of photographing directions. Thus, it is possible to select a moving image in a photographing direction close to a direction from the photographer 412 to the object 401 (sound source). The moving image in the photographing direction close to the direction from the photographer 412 to the object 401 (sound source) is a moving image close to a moving image seen from the photographing position of the moving-image content 502 or a moving image matching the sound of the moving-image content 502. Therefore, it is possible to generate a combination content with high presence. The image-quality information may include information such as color depth and dark-part noise. Thus, it is possible to select a clear moving image among moving images photographed in a night scene.

Figure 5D:
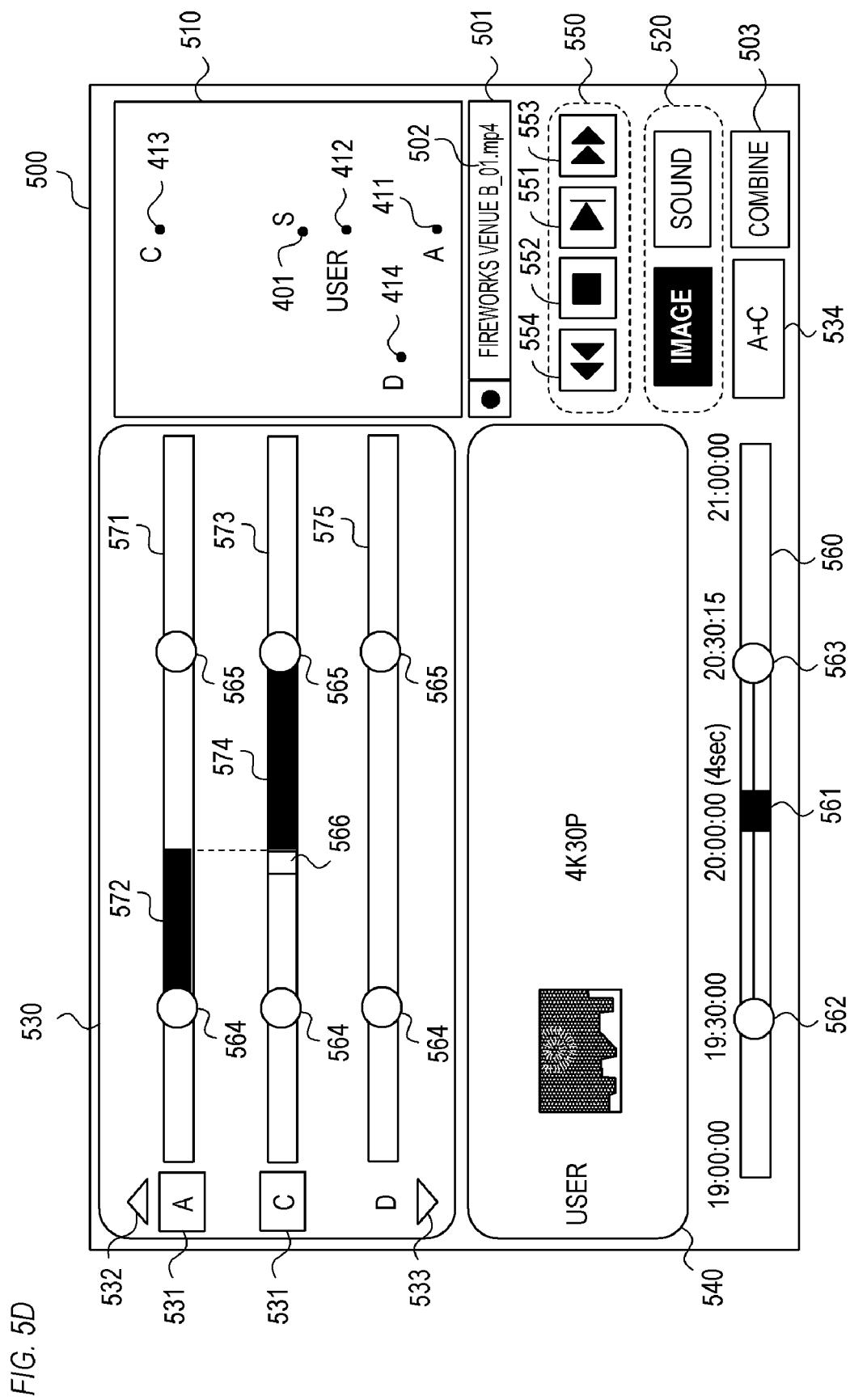

FIG. 5D shows a modified example of the application screen 500. In the application screen 500 of FIG. 5D, it is possible to select a plurality of moving-image contents in the selection content information window 530. In the selection content information window 530, seek bars 571, 573, and 575 used to designate combination periods are displayed. In each of the seek bars 571, 573, and 575, pointers 564 and 565 linked to the combination start pointer 562 and the combination end pointer 563 are displayed. When a plurality of moving-image contents are selected, pointers 566 used to designate a plurality of combination periods are displayed. For example, when N (N is at least two) moving-image contents are selected, N−1 pointers 566 used to designate N combination periods are displayed. The cloud control unit 301 sets a plurality of combination periods according to the positions of the pointers 566. Note that the time (combination start time) of the combination start pointer 562 corresponds to the start time of the first combination period and the time (combination end time) of the combination end pointer 563 corresponds to the end time of the last combination period. It can be said that the pointers 566 are pointers used to designate the switching times of the plurality of combination periods. In this case, the image and sound combination unit 372 replaces moving images or sounds in the plurality of periods (the plurality of combination periods) of the moving-image content 502 with those of other plurality of moving-image contents to generate a combination content. Thus, it is possible to obtain a high-quality combination content for a long period.

In the example of FIG. 5D, a moving-image content A (a moving-image content photographed at the point A) and a moving-image content C (a moving-image content photographed at the point C) are selected, and one pointer 566 is displayed in the seek bar 573 of the moving-image content C. A period from the combination start time to the time of the pointer 566 is set as the combination period 572 in which the moving-image content A is combined, and a period from the time of the pointer 566 to the combination end time is set as the combination period 574 in which the moving-image content C is combined. The image and sound combination unit 372 replaces the moving image or the sound of the moving-image content 502 in the combination period 572 with that of the moving-image content A. In addition, the image and sound combination unit 372 replaces the moving image or the sound of the moving-image content 502 in the combination period 574 with that of the moving-image content C. Thus, a combination content is generated.

Note that the cloud control unit 301 may narrow down candidates for moving-image contents to be combined with the moving-image content 502. Here, a case in which the moving-image content 502 is a moving-image content uploaded to SNS and the user (photographer 412) adds tag information to the moving-image content 502 will be considered. In this case, moving-image contents to which tag information relating to the tag information of the moving-image content 502 is added among a plurality of moving-image contents uploaded to the SNS may be set as candidates for moving-image contents to be combined with the moving-image content 502. Thus, it is possible to generate a combination content matching the values of the photographer 412.

An example in which the cloud server 300 separates a moving-image content into a moving image and a sound or combines a moving-image and a sound together to generate a combination content is described above, but the present invention is not limited to the example. For example, at least one of separation processing and combination processing may be included in an application of the smart phone 330. That is, the smart phone 330 may perform the separation processing or the combination processing.

An example in which the moving-image contents of respective terminals are stored in the cloud data storage 250 is described above, but the present invention is not limited to the example. For example, the data of moving-image contents may be directly transferred from other terminals to the data storage (not shown) of the smart phone 330 via the global network 320. In this case, only the data of a period (the data of a combination period) to be included in a combination content may be transferred. Thus, it is possible to reduce a data communication amount. The transferred data may be data before separation or data after the separation. The transferred data may or may not be data (that is one of the data of a moving image and the data of a sound) to be included in a combination content. When only the data to be included in the combination content is transferred, it is possible to further reduce the data communication amount.

Figure 5E:
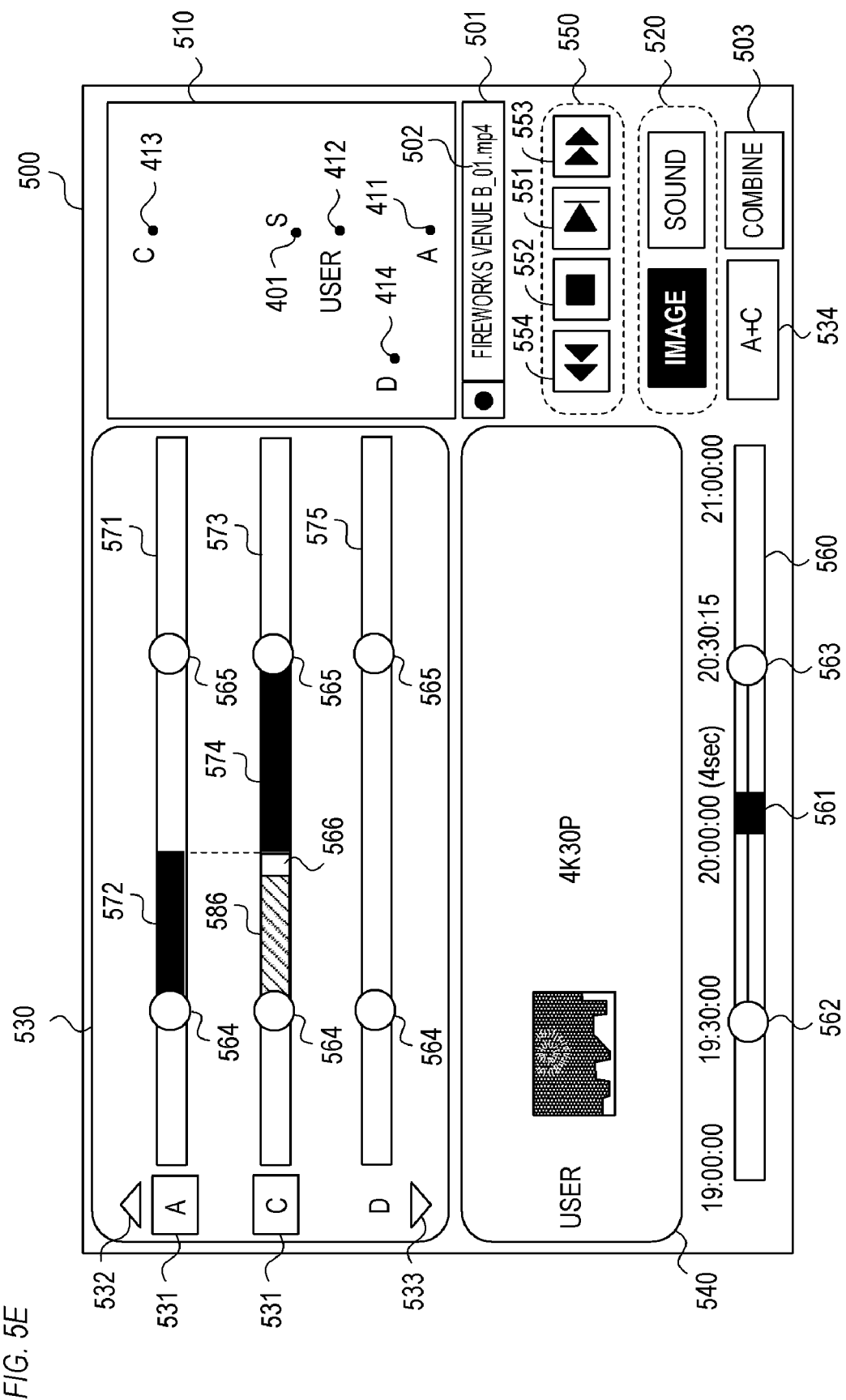

In a moving-image content, a rejection period in which a moving image and a sound are not allowed to be included in other moving-image contents may be settable. In FIG. 5E, the photographer 414 sets a rejection period 586. In the selection content information window 530, the rejection period 586 is displayed. The combination of a moving image is not allowed in the rejection period 586. Thus, it is possible to prevent a moving image or a sound from being shared in a specific period. Data in a rejection period is not transferred to the smart phone 330.

Figure 6A:
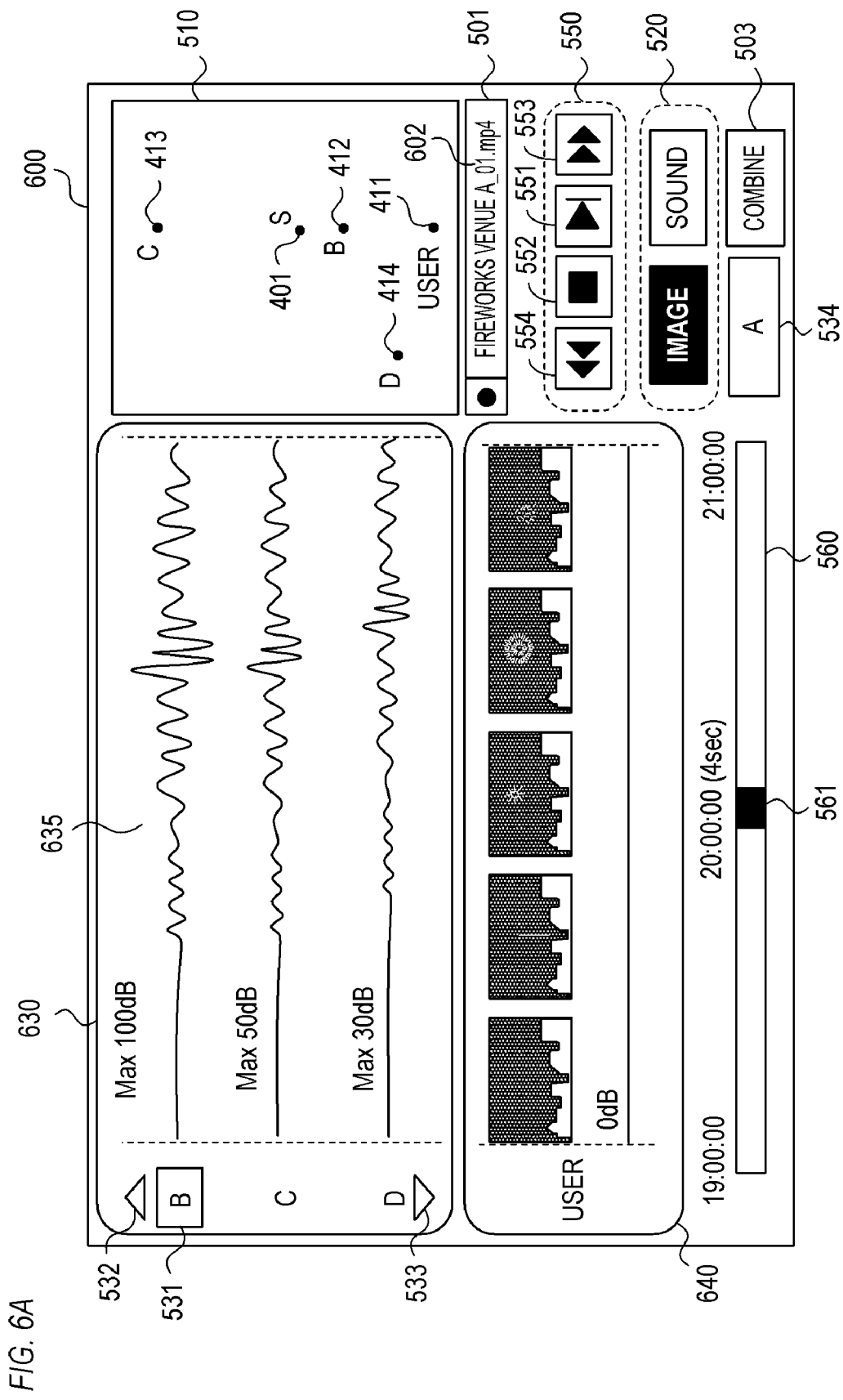
FIGS. 6A and 6B are diagrams showing an application screen.

A case in which combining a sound is selected by the sound and image selection button 520 will be described. FIG. 6A shows an example of an application screen 600 of the PC 360. The application screen 600 is, for example, the screen of a web browser or the screen of a dedicated application. Here, the user of the PC 360 is the user (photographer 411) of the camera 100 and uses the PC 360 to edit a moving-image content 602 photographed by the camera 100. The camera 100 corresponds to a first camera of the present invention, and another device (terminal) used for photographing corresponds to a second camera of the present invention.

The data of the moving-image content 602 selected by the user (photographer 411) is displayed in a user content information window 640. In the user content information window 640, the reduction images (thumbnails) of moving images are displayed as items (image information) relating to the moving images of the moving-image content 602. Further, the waveform of a sound is also displayed as an item (sound information) relating to the sound of the moving-image content 602. The sound of the moving-image content 602 photographed by the photographer 411 is tuneless, and the quality of the sound is low. In such a case, the user selects an item "sound (combining a sound)" with a sound and image selection button 520.

A selection content information window 630 is a window in which the data of moving-image contents other than the moving-image content 602 among moving-image contents displayed in a position display window 510 is displayed. In FIG. 5A, the image information is displayed in the selection content information window 530 as the data of the moving-image contents other than the moving-image content 502 to combine a moving image with the moving-image content 502 selected by the user. On the other hand, in FIG. 6A, sound information is displayed in the selection content information window 630 as the data of moving-image contents other than the moving-image content 602 to combine a sound with the moving-image content 602 selected by the user. Of course, both image information and the sound information may be displayed. In FIG. 6A, sound waves 635 are displayed as the sound information. The user (photographer 411) is enabled to discriminate a preferred sound by confirming the sound waveforms 635.

When a combination start button 503 is touched, the PC 360 transmits a control signal for starting combination to the cloud server 300. The control signal is input to the cloud control unit 301 via the cloud communication unit 304. The cloud control unit 301 performs control to generate a combination content according to the reception of the control signal.

Here, combining a sound with the moving-image content 602 is selected by the sound and image selection button 520. Therefore, the cloud control unit 301 performs control to combine the moving image (moving-image data) of a moving-image content 602 and the sound (sound data) of a moving-image content displayed in the selection result window 534 together. Specifically, the cloud control unit 301 instructs the image and sound separation unit 371 to separate sound data from the data of the moving-image content displayed in the selection result window 534. The image and sound separation unit 371 stores the separated moving-image data in the cloud storage unit 302 and notifies the cloud control unit 301 of the completion of the separation. Upon receiving the notification of the completion of the separation, the cloud control unit 301 instructs the image and sound combination unit 372 to combine the moving-image data of the moving-image content 602 and the sound data of the moving-image content displayed in the selection result window 534 together. Both the moving-image data and the sound data are stored in the cloud storage unit 302. The image and sound combination unit 372 stores a moving-image content (combination content) obtained by the combination in the cloud data storage 250, the cloud storage unit 302, or the PC 360 (user terminal). The user is enabled to confirm the combination content using the PC 360.

Figure 6B:
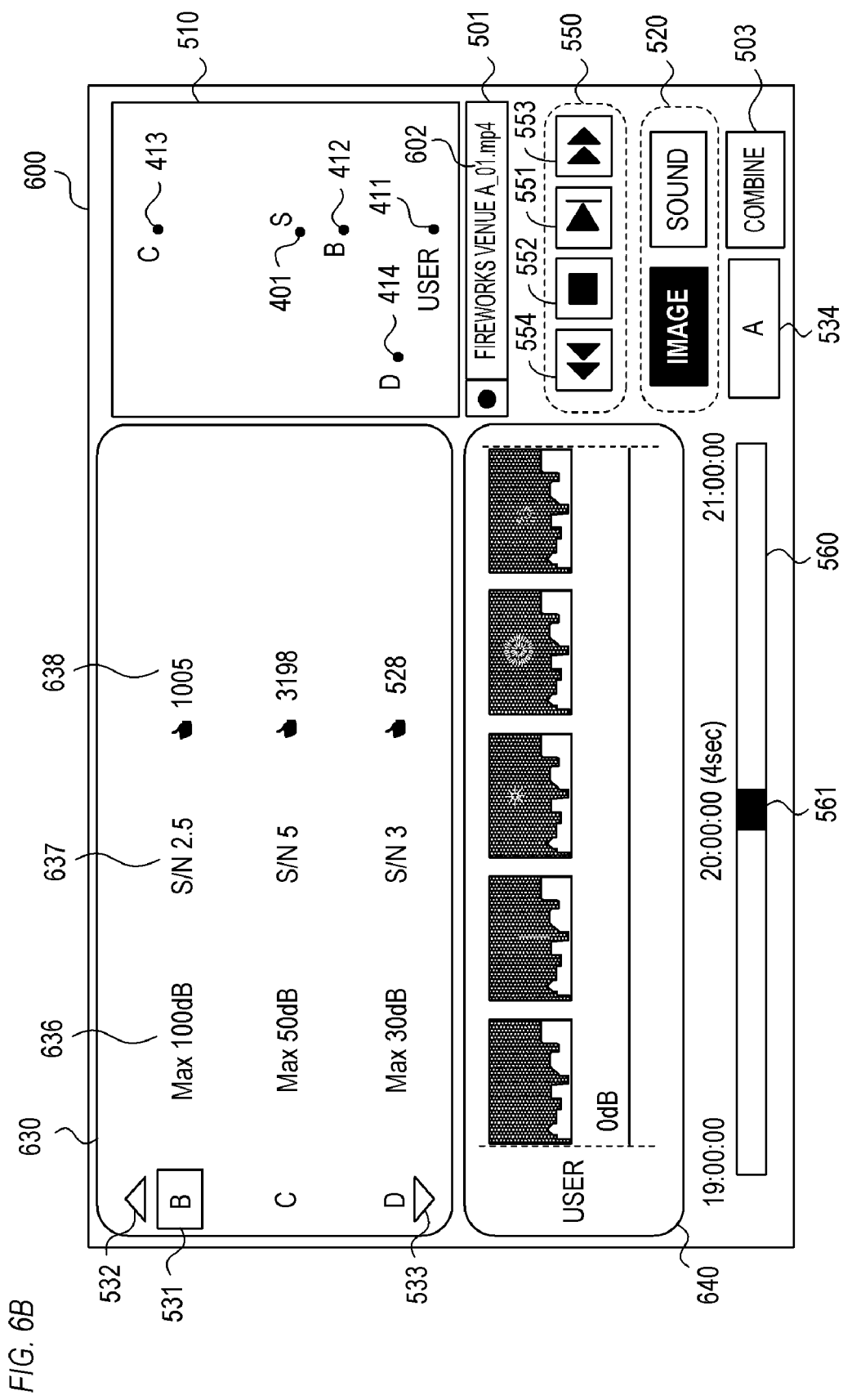

FIG. 6B shows a modified example of the application screen 600. In the selection content information window 630 of FIG. 6B, sound-volume information 636 indicating sound volumes is displayed as sound information. It is possible to select a sound of a proper level with the display of the sound-volume information 636. Further, S/N ratio information 637 indicating S/N (Signal-to-Noise) ratios is also displayed as sound information. The S/N ratio information 637 is suitable for a case in which a sound is required to be normalized and combined. In addition, user evaluation values 638 are also displayed as sound information. Through the display of the user evaluation values 638, the user (photographer 411) is enabled to select a moving image on the basis of evaluation by other users. As a result, it is possible to generate a combination content easily evaluated by third persons.

The sound information is not limited to the above but may include, for example, the information of distances from the object (sound source) 401 to photographing positions. Since sound quality depends on a distance from the sound source, it is possible to select a high-quality sound. Further, the sound information may include the information of photographing directions. Thus, it is possible to select a sound in a photographing direction close to a direction from the photographer 411 to the object 401 (sound source). The sound in the photographing direction close to the direction from the photographer 411 to the object 401 is a sound close to a sound heard from the photographing position of the moving-image content 602 or a sound matching the moving image of the moving-image content 602. Therefore, it is possible to generate a combination content with high presence.

Further, when a combined sound is a stereo sound, the L (left)-channel and the R (right)-channel of the combined sound may be adjusted according to the photographing position (recording position) of the combined sound, the photographing position of the moving-image content 602, and the position of the object 401 (sound source). For example, when the photographing position (recording position) of a combined sound is on a side opposite to the photographing position of the moving-image content 602 over the object 401 (sound source), the L-channel and the R-channel may be switched. Thus, it is possible to establish an appropriate relationship between a moving image and a sound in a combination content and reduce a sense of discomfort.

Figure 7B:
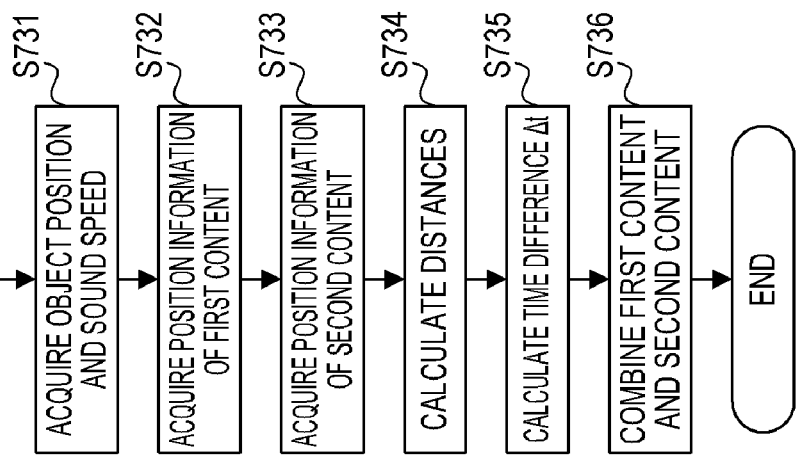
FIG. 7B is a flowchart of combination processing.
Figure 7A:
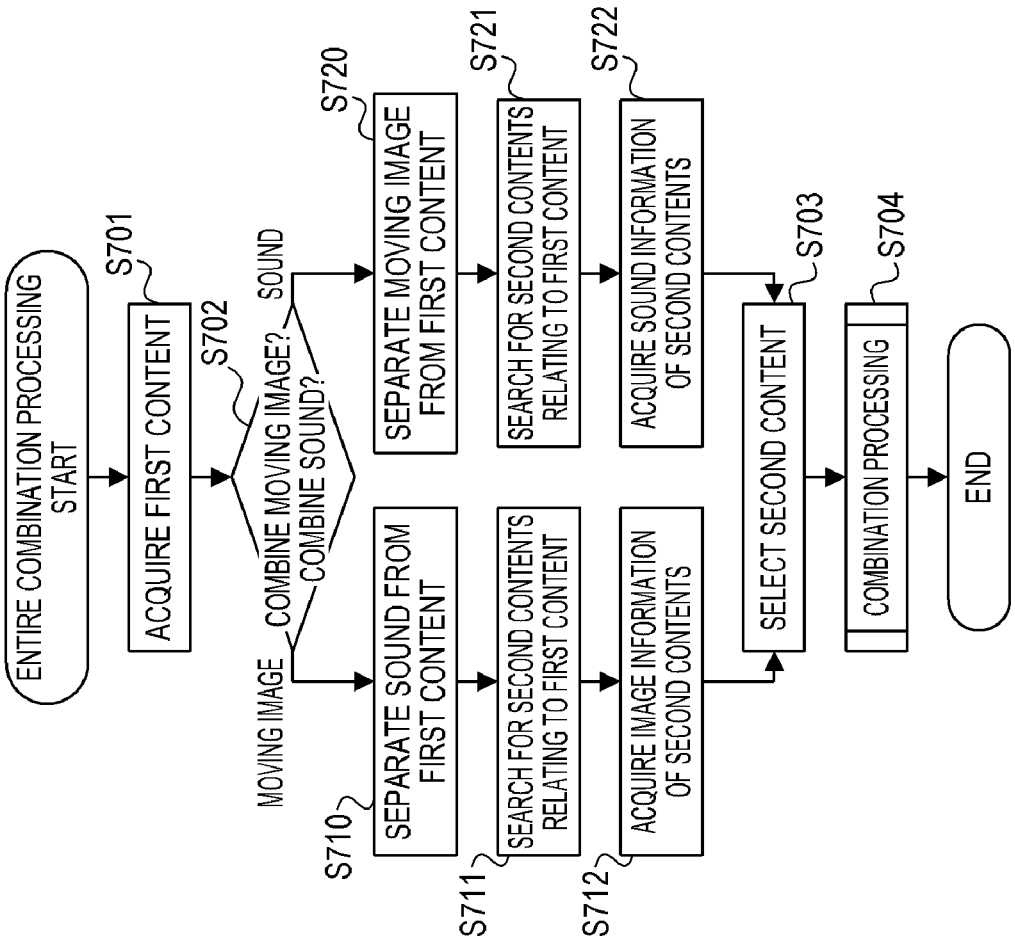
FIG. 7A is a flowchart of entire combination processing.

FIG. 7A is a flowchart showing an example of entire combination processing in the cloud server 300. The processing is realized when the cloud control unit 301 develops a program recorded on the ROM 302A into the RAM 302B and performs the developed program. The processing of FIG. 7A starts, for example, when a terminal accesses the cloud server 300.

In step S701, the cloud control unit 301 acquires the data of a moving-image content (first content) selected by the file selection button 501 from the cloud data storage 250. Thus, it is possible to display the moving-image content in the user content information window 540. Further, it is also possible to display the photographing position of the first content in the position display window 510. The information (position information) of the photographing position is stored in, for example, the meta information of the moving-image content.

In step S702, the cloud control unit 301 determines whether a sound is combined or a moving image is combined with the first content. A user selects whether a sound is combined or a moving image is combined with the first content by the sound and image selection button 520. The processing proceeds to step S710 when a moving image is combined and proceeds to step S720 when a sound is combined.

In step S710, the cloud control unit 301 separates (extracts) sound data from the data (the data of the first content) acquired in step S701 using the image and sound separation unit 371.

In step S711, the cloud control unit 301 searches for a plurality of moving-image contents (a plurality of second contents) relating to the first content from the cloud data storage 250. For example, the cloud control unit 301 searches for a plurality of moving-image contents at photographing positions close to the photographing position of the first content from the cloud data storage 250. When the first content is a moving-image content uploaded to SNS, the cloud control unit 301 may search for a plurality of moving-image contents on the basis of tag information.

In step S712, the cloud control unit 301 acquires the image information (such as a thumbnail, resolution, color depth, dark-part noise, a photographing direction, and a user evaluation value of a moving image) or the information of the photographing position of each of the plurality of second contents. Thus, it is possible to display the image information in the selection content information window 530. Further, it is also possible to display the photographing position of each of the plurality of second contents in the position display window 510.

In step S720, the cloud control unit 301 separates (extracts) moving-image data from the data (the data of the first content) acquired in step S701 using the image and sound separation unit 371.

In step S721, like step S711, the cloud control unit 301 searches for a plurality of moving-image contents (a plurality of second contents) relating to the first content from the cloud data storage 250.

In step S722, the cloud control unit 301 acquires the sound information (such as a sound waveform, a sound volume, an S/N ratio, a distance from an object (sound source) to a photographing position, a photographing direction, and a user evaluation value) or the information of the photographing position of each of the plurality of second contents. Thus, it is possible to display the sound information in the selection content information window 630. Further, it is also possible to display the photographing position of each of the plurality of second contents in the position display window 510.

In step S703, the cloud control unit 301 selects a second content to be combined (a second content indicated by the combination selection cursor 531) from among the plurality of second contents. The user is enabled to designate (select) the second content to be combined through the combination selection cursor 531. The cloud control unit 301 selects the second content designated by the user through the combination selection cursor 531. At this time, the cloud control unit 301 may also determine a combination period.

In step S704, the cloud control unit 301 generates a combination content using the image and sound separation unit 371 and the image and sound combination unit 372 (combination processing). Specifically, when performing the processing of steps S710 to S712, the cloud control unit 301 extracts moving-image data from the data of the second content selected in step S703 using the image and sound separation unit 371. Then, the cloud control unit 301 combines the sound data (the sound data of the first content) extracted in step S710 and the moving-image data of the second content selected in step S703 together using the image and sound combination unit 372. When performing the processing of steps S720 to S722, the cloud control unit 301 extracts sound data from the data of the second content selected in step S703 using the image and sound separation unit 371. Then, the cloud control unit 301 combines the moving-image data (the moving-image data of the first content) extracted in step S720 and the sound data of the second content selected in step S703 together using the image and sound combination unit 372. The cloud control unit 301 stores the data of the combination content in the cloud data storage 250, the cloud storage unit 302, or a user terminal.

In the combination processing of step S704, the sound data and the moving-image data are combined on the basis of, for example, the time of the NTP server 321. That is, the sound data and the moving-image data are combined so that the sound data and the moving-image data that were recorded (or photographed) at the same time are to be reproduced at the same time. However, if distances from an object (sound source) to photographing positions are largely different between the sound data and the moving-image data that are to be combined, a combination content with low presence (a combination content with a sense of discomfort) in which the moving image and the sound are deviated from each other is generated.

Therefore, the cloud control unit 301 preferably adjusts the time position of at least one of the first content and the second content on the basis of a distance from the object to the photographing position of the first content and a distance from the object to the photographing position of the second content. In this case, the cloud control unit 301 combines the first content and the second content after the adjustment together.

Thus, it is possible to generate a combination content with higher presence. The position of the object may be set in advance or may be calculated by triangulation on the basis of the information of a photographing position or a photographing direction (posture) added to a moving-image content.

For example, the difference between a distance SA from an object position S to a photographing position A and a distance SB from the object position S to a photographing position B in FIG. 4A is large. Therefore, when a moving-image content (one of a moving image and a sound) at the photographing position A and a moving-image content (the other of a moving image and a sound) at the photographing position B are combined without the adjustment of a time position, a time difference Δt (deviation) corresponding to the difference between the distance SA and the distance SB is caused between the moving image and the sound. The time difference Δt may be calculated by the following Formula 1. In Formula 1, V represents a sound speed.

$$\Delta t = (SA - SB)/V \quad \text{(Formula 1)}$$

Therefore, in order to provide the time difference Δt between the moving-image content (moving-image content A) at the photographing position A and the moving-image content (moving-image content B) at the photographing position B, the cloud control unit 301 adjusts the time position of at least one of the moving-image contents A and B. The time position is adjusted so that the deviation between the moving image and the sound in a combination content is reduced. For example, since the sound of the moving-image content A is delayed by the time of the time difference Δt with respect to the sound of the moving-image content B, the cloud control unit 301 delays the time position of the moving-image content B by the time of the time difference Δt. Note that the deviation between the moving image and the sound in the combination content is only required to be reduced. Therefore, the adjustment amount of the time position may be larger or smaller than Δt.

The above example is an example in which a photographing magnification is not considered (a case in which a photographing magnification is 1 time). When a photographing magnification increases, a photographing position is falsely made close to an object. Therefore, in order to generate a combination content with higher presence, the difference between photographing magnifications (the difference between field angles) is preferably considered. Here, it is assumed that the focal-point distance of the lens of a camera photographing the moving-image content A is f1 and the image circle diameter of the camera is D1. It is assumed that the focal-point distance of the lens of a camera photographing the moving-image content B is f2 and the image circle diameter of the camera is D2. Further, it is assumed that the image circle diameter of a sensor having a sensor size of 35 mm is D0 and a reference focal-point distance is f0. For example, the image circle diameter D0 is the image circle diameter of a full-size sensor, and the reference focal-point distance f0 is 50 mm. Here, a case in which the distances SA and SB are substantially larger than the focal-point distances f1 and f2 will be considered. In this case, as shown in the following Formula 2, a substantial time difference Δt is determined according to the difference between a distance obtained by multiplying the distance SA by the image circle diameter D1 to the ratio of the focal-point distance f1 and a distance obtained by multiplying the distance SB by the image circle diameter D2 to the ratio of the focal-point distance f2.

$$\Delta t = (SA \cdot D1/f1 - SB \cdot D2/f2)/(V \cdot D0/f0) \quad \text{(Formula 2)}$$

If the time position of at least one of the moving-image content A and the moving-image content B is adjusted so as to provide the time difference Δt obtained by Formula 2 between the moving-image content A and the moving-image content B, it is possible to generate a combination content with high presence even in a case in which the moving-image contents obtained by zoom photographing are combined.

Note that when the entire sound or moving image of a moving-image content (first content) is replaced with that of another moving-image content (second content), data in a period including the period of the first content is preferably acquired as the data of the second content and used for combination. Specifically, data from a time before and near the photographing start time of the first content to a time after and near the photographing end time of the first content is acquired. Thus, it is possible to prevent the generation of the period of a moving image or a sound in a combination content when a time position is adjusted to perform combination.

FIG. 7B is a flowchart showing an example of the combination processing in step S704 of FIG. 7A. The processing is realized when the cloud control unit 301 develops a program recorded on the ROM 302A into the RAM 302B and performs the developed program.

In step S731, the cloud control unit 301 acquires the information of the position and the sound speed of an object 401 that is a sound source. The cloud control unit 301 may search for the position of the object 401 from the global network 320. As the information of a sound speed, the cloud control unit 301 may acquire the information of an approximate value 340 m/s or may strictly calculate a sound speed from humidity or temperature during photographing.

In step S732, the cloud control unit 301 acquires the information of the photographing position of a first content. In step S733, the cloud control unit 301 acquires the information of the photographing position of a second content. The information of the photographing positions is acquired from, for example, the meta information of the moving-image contents.

In step S734, the cloud control unit 301 calculates a distance from the position of the object 401 to the photographing position of the first content and a distance from the position of the object 401 to the photographing position of the second content on the basis of the processing results of steps S731 to S733.

In step S735, the cloud control unit 301 calculates a time difference Δt on the basis of the above Formula 1 or Formula 2.

In step S736, the cloud control unit 301 adjusts the time position of at least one of the first content and the second content on the basis of the time difference Δt calculated in step S735 and combines the first content and the second content together.

According to the present embodiment described above, an image or a sound used for recording is not limited to an image or a sound acquired in a device used by a user for photographing, but an image or a sound at a position distant from the user is available. That is, a desired image or a sound may be recorded. Thus, it is possible to easily generate a high-quality moving-image content without performing photographing again.

Note that the various control described above as being performed by the cloud control unit 301 may be performed by one hardware, or processing may be borne by a plurality of hardware (for example, a plurality of processors or circuits) to control an entire apparatus.

Further, the present invention is described in detail above on the basis of its preferred embodiments. However, the present invention is not limited to the specific embodiments, and various modes are also included in the present invention within the scope of the present invention. In addition, the respective embodiments described above show only one embodiment of the present invention and may be appropriately combined together.

Further, a case in which the present invention is applied to a cloud server is described as an example in the embodiment, but the present invention is not limited to the example. The present invention is applicable to an electronic device enabled to edit a moving-image content. The present invention is applicable not only to an electronic device body but also to a control apparatus that communicates with electronic device (including a network camera) through wired or wireless communication and remotely controls the electronic device. For example, the present invention is applicable to a personal computer, a PDA, a mobile telephone terminal, a mobile image viewer, a printer apparatus, a digital photo frame, a music player, a game machine, an electronic book reader, an imaging apparatus, or the like. Further, the present invention is applicable to a video player, a display apparatus (including a projection apparatus), a tablet terminal, a smart phone, an AI speaker, a home-electric apparatus, an in-vehicle apparatus, or the like.

According to the present disclosure, it is possible to easily generate a high-quality content.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-060114, filed on Mar. 31, 2021, which is hereby incorporated by reference herein in its entirety.

What is claimed is:

1. An electronic device comprising:
a processor; and
a memory storing a program which, when executed by the processor, causes the electronic device to
perform extraction processing to extract a moving image or a sound from at least any of a plurality of second contents respectively photographed by a plurality of second cameras different from a first camera,
perform acquisition processing to
in a case where the moving image is extracted from at least any of the plurality of second contents, acquire a third content including the extracted moving image and a sound included in a first content photographed by the first camera,
in a case where the sound is extracted from at least any of the plurality of second contents, acquire a fourth content including the extracted sound and a moving image included in the first content,
in the case where the moving image is extracted by the extraction processing, perform control to display, as each of a plurality of items respectively corresponding to the plurality of second contents, an item relating to the moving image included in a second content corresponding to the item, and
in the case where the sound is extracted by the extraction processing, perform control to display, as each of the plurality of items, an item relating to the sound included in a second content corresponding to the item, wherein
the item relating to the moving image is at least any of image quality information and a photographing direction,
the item relating to the sound is at least any of a sound volume, an S/N ratio, a waveform, a distance from an object to a photographing position, and a photographing direction, and
in the acquisition processing,
a time position of at least one of the first content and the second content is adjusted so that a time difference in accordance with a difference between a distance obtained by multiplying a first distance by a ratio of an image circle diameter of the first camera to a focal-point distance of the first camera and a distance obtained by multiplying a second distance by a ratio of an image circle diameter of the second camera to a focal-point distance of the second camera is provided between the first content and the second content, the first distance being a distance from a photographing position of the first content to an object, and the second distance being a distance from a photographing position of the second content of which the moving image or the sound is extracted by the extraction processing to the object, and
the first content and the second content after adjustment are combined to generate the third content or the fourth content.

2. The electronic device according to claim 1, further comprising:
the first camera, wherein
the plurality of second cameras are provided in a device different from the electronic device.

3. The electronic device according to claim 1, wherein
in the case where the moving image is extracted from at least any of the plurality of second contents, in the acquisition processing, the extracted moving image and a sound included in the first content are combined to generate the third content, and
in the case where the sound is extracted from at least any of the plurality of second contents, in the acquisition processing, the extracted sound and a moving image included in the first content are combined to generate the fourth content.

4. The electronic device according to claim 1, wherein
the item relating to the moving image includes a reduction image of the moving image, and
the reduction image included in the item is displayed so as to enable reproduction of the moving image.

5. The electronic device according to claim 4, wherein
a plurality of reduction images included in the plurality of items enable simultaneous reproduction of the moving images.

6. The electronic device according to claim 1, wherein
the item relating to the moving image further indicates an evaluation value by a user.

7. The electronic device according to claim 1, wherein
the item relating to the sound further indicates an evaluation value by a user.

8. The electronic device according to claim 1, wherein
the program, when executed by the processor, further causes the electronic device to perform control to further display a second item which is different from the plurality of items and indicates an object, a photographing position of the first content, and respective photographing positions of the plurality of second contents.

9. The electronic device according to claim 1, wherein
in the acquisition processing a content in which a moving image or a sound in a part of a period of the first content is replaced with a moving image or a sound of the second content is acquired as the third content or the fourth content.

10. The electronic device according to claim 9, wherein
in the acquisition processing a content in which moving images or sounds in a plurality of periods of the first content are respectively replaced with images or sounds in the plurality of second contents is acquired as the third content or the fourth content.

11. The electronic device according to claim 9, wherein
in the acquisition processing data in a period to be included in the third content or the fourth content is acquired as data of the second content to acquire the third content or the fourth content.

12. The electronic device according to claim 9, wherein
a rejection period in which a moving image and a sound are not allowed to be included in other contents is set in at least any of the plurality of second contents.

13. The electronic device according to claim 1, wherein
in the acquisition processing, data in a period including a period of the first content is acquired as data of the second content to acquire the third content or the fourth content.

14. The electronic device according to claim 1, wherein
the first content is a content uploaded to SNS (Social Network Site), and
the second content is a content to which tag information relating to tag information of the first content is added among a plurality of contents uploaded to the SNS.

15. A control method of an electronic device, the control method comprising:
extracting a moving image or a sound from at least any of a plurality of second contents respectively photographed by a plurality of second cameras different from a first camera; and
in a case where the moving image is extracted from at least any of the plurality of second contents, acquiring a third content including the extracted moving image and a sound included in a first content photographed by the first camera;
in a case where the sound is extracted from at least any of the plurality of second contents, acquiring a fourth content including the extracted sound and a moving image included in the first content;
in the case where the moving image is extracted, performing control to display, as each of a plurality of items respectively corresponding to the plurality of second contents, an item relating to the moving image included in a second content corresponding to the item; and
in the case where the sound is extracted, performing control to display, as each of the plurality of items, an item relating to the sound included in a second content corresponding to the item, wherein
the item relating to the moving image is at least any of image quality information and a photographing direction,
the item relating to the sound is at least any of a sound volume, an S/N ratio, a waveform, a distance from an object to a photographing position, and a photographing direction,
a time position of at least one of the first content and the second content is adjusted so that a time difference in accordance with a difference between a distance obtained by multiplying a first distance by a ratio of an image circle diameter of the first camera to a focal-point distance of the first camera and a distance obtained by multiplying a second distance by a ratio of an image circle diameter of the second camera to a focal-point distance of the second camera is provided between the first content and the second content, the first distance being a distance from a photographing position of the first content to an object, and the second distance being a distance from a photographing position of the second content of which the moving image or the sound is extracted by the extraction processing to the object, and
the first content and the second content after adjustment are combined to generate the third content or the fourth content.

16. A non-transitory computer readable storage medium that stores a program, wherein the program causes a computer to execute a control method of an electronic device, the control method comprising:
extracting a moving image or a sound from at least any of a plurality of second contents respectively photographed by a plurality of second cameras different from a first camera;
in a case where the moving image is extracted from at least any of the plurality of second contents, acquiring a third content including the extracted moving image and a sound included in a first content photographed by the first camera;
in a case where the sound is extracted from at least any of the plurality of second contents, acquiring a fourth content including the extracted sound and a moving image included in the first content;
in the case where the moving image is extracted, performing control to display, as each of a plurality of items respectively corresponding to the plurality of second contents, an item relating to the moving image included in a second content corresponding to the item; and
in the case where the sound is extracted, performing control to display, as each of the plurality of items, an item relating to the sound included in a second content corresponding to the item, wherein
the item relating to the moving image is at least any of image quality information and a photographing direction,
the item relating to the sound is at least any of a sound volume, an S/N ratio, a waveform, a distance from an object to a photographing position, and a photographing direction,
a time position of at least one of the first content and the second content is adjusted so that a time difference in accordance with a difference between a distance obtained by multiplying a first distance by a ratio of an image circle diameter of the first camera to a focal-point distance of the first camera and a distance obtained by multiplying a second distance by a ratio of an image circle diameter of the second camera to a focal-point distance of the second camera is provided between the first content and the second content, the first distance being a distance from a photographing position of the first content to an object, and the second distance being a distance from a photographing position of the second content of which the moving image or the sound is extracted by the extraction processing to the object, and
the first content and the second content after adjustment are combined to generate the third content or the fourth content.

* * * * *